UNITED STATES PATENT OFFICE.

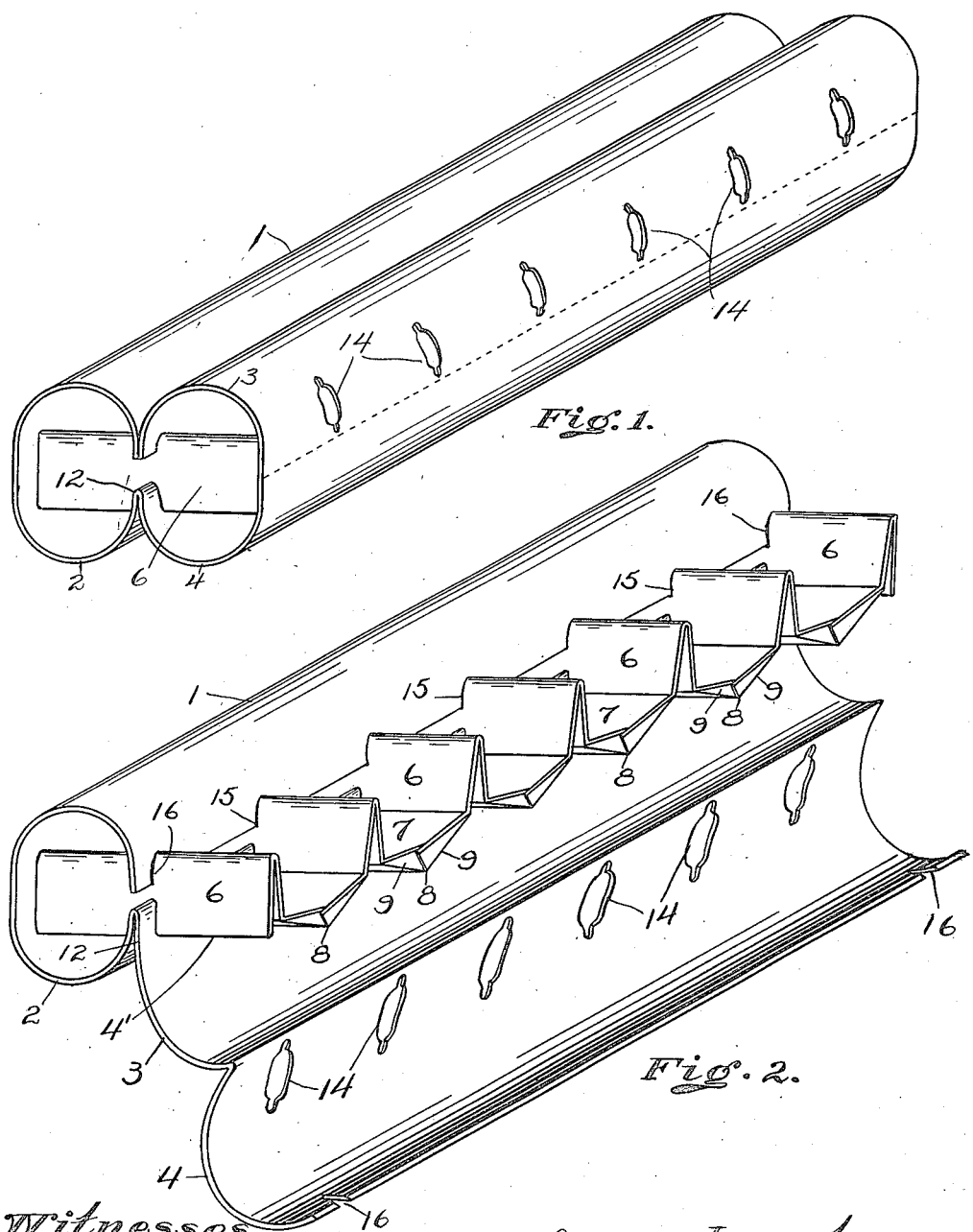

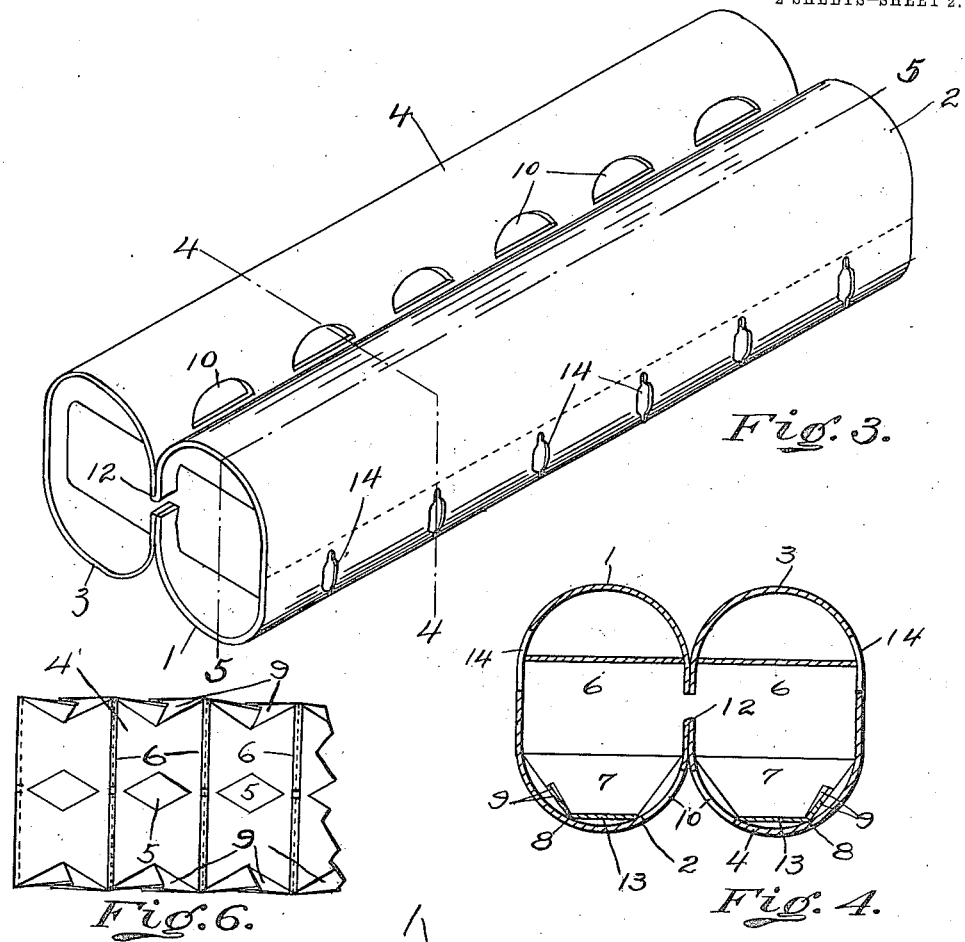
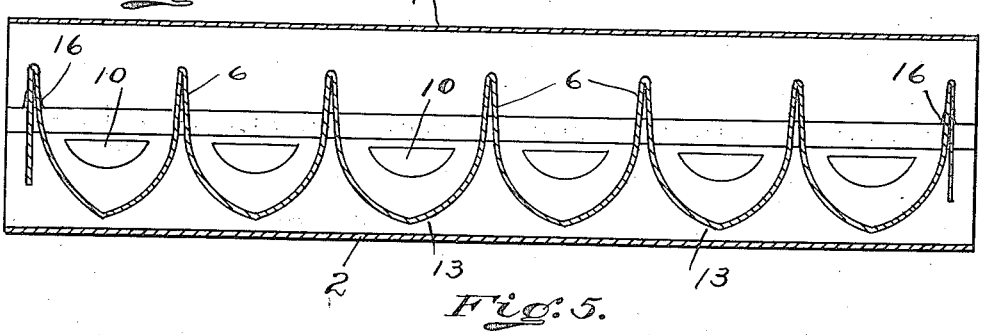

LOUIS A. DEGGINGER, OF COVINGTON, KENTUCKY, ASSIGNOR TO THE NO-BREAK EGG CARRIER COMPANY, OF CINCINNATI, OHIO, A CORPORATION OF OHIO.

EGG-CARRIER.

1,124,713. Specification of Letters Patent. Patented Jan. 12, 1915.

Application filed September 11, 1914. Serial No. 861,275.

*To all whom it may concern:*

Be it known that I, LOUIS A. DEGGINGER, a citizen of the United States, residing in the city of Covington, in the county of Kenton and State of Kentucky, have invented certain new and useful Improvements in Egg-Carriers, of which the following is a specification.

In the shipment of eggs, the breakage has been so great that it has been the object of inventors, for a long time, to produce egg carrying means which shall cut this breakage down to a minimum; and it has further been their object to produce an egg carrier in which a small allotment of eggs can be placed by the farmer, and by him placed in a large crate holding a large number of the egg carriers, so that the egg carriers in the crate will reach the consumer as they are packed on the farm, no matter through whose hands they may pass.

The object of my invention is to produce an egg carrier of this character, in which a dozen or more eggs can be placed by the farmer, the carrier placed in the large shipping crate and then shipped by him to the commission house or retailer, so that the eggs can be handed out by the retailer to the customers in original packages.

A further object of my invention is to produce an egg carrier which can be made at a very nominal price, so it can be given away with the eggs and in which the breakage of the eggs will be cut down to a minimum.

A further object is to cushion the eggs in a novel way so as to prevent breakage, to lock the carrier when filled by its own peculiar construction, and further to coat it or impregnate it with a solution which will make it sanitary, preserve the eggs and make it water-proof. It is unique in appearance and construction, it can be handled very readily and further is provided with openings or holes placed at varying positions so that the eggs can be candled while in the original package, by the farmer, wholesaler, retailer or the consumer. By placing the openings in the egg carrier in a peculiar manner I force or attain a reflected light so that the whole egg can be seen and thoroughly candled.

The other features and advantages of my invention will readily become apparent from a perusal of the following specification.

In the accompanying drawing forming part of the specification, Figure (1), is an isometric view of the carrier, closed—Fig. (2), is an isometric view thereof with one side opened up and dropped down to illustrate the construction of the egg carrying tray—Fig. (3), is an isometric view of the egg carrier closed, and looking at it from the bottom—Fig. (4), is a cross section taken on the line 4—4 of Fig. (3), Fig. (5), is a longitudinal section taken on the line 5—5 of Fig. (3), and Fig. (6) is a broken away plan view of part of the egg tray.

The body of the egg carrier is composed of four semi-annular, elongated half tubes 1, 2, 3, 4, made from a sheet of card board or any suitable material. The egg carrying tray (4') which fits into the body of the egg carrier is composed of a strip or strips of card board or the like, having central elongated eye shaped slots as (5), and at intervals bent up and folded to form a double wall (6) of an inverted V-shape in contour; between these walls (6) are formed the egg carrying pockets (7). At their outer edges the egg carrying pockets (7) are cut by a slit (8) and the folding edges (9) are turned up one over-lapping the other at the bottom so as to form a double support for the eggs, the walls of the annular body portions (1) and (4) when in position pressing the folding edges (9) into a contour conforming to the shape thereof so that the egg will be cushioned, and the lower one of the edges forming a pier or bearing which first receives the shock and absorbs it, thus preventing said shock from reaching the egg; the egg on the inner side of the pockets (7) being protected from injury by the peculiar slope of the carrier walls and the slots (10). The egg carrying tray (4') is supported in the body of the carrier by reason of the slots (5) passing over the inner meeting edges (12) of the body parts (2) and (4), so that said egg tray will be supported and suspended on said edges (12), an air space (13) being left at the bottom of the tray, between it and the body portions (2) and (3) so that the eggs will receive proper ventilation and also be cushioned by said air space. The slots (10) are semiannular in contour, or may be of any other preferred shape or contour and are usually and preferably cut in the bottom of the carrier at the inner meeting edges (12) of the body parts (2) and (3) at a suitable distance from the top of edges (12), one slot being cut in each edge (12) so as to provide a slot for each pocket.

In the outer body portions (1) and (4) opposite each egg pocket (7), at a point near the inner meeting edge of the egg carrier body parts (1) and (2) and (3) and (4), I place elongated slots as (14) formed widest at the middle and narrowed at the edges so as to form means for allowing light to enter over an extended space. These slots (10) and (14) are at the farthest points apart possible in the carrier on each side so that the entire egg can be properly candled. By looking through slots (10) the slots (14) being next to the light used for candling, a reflection of the rays of light is thrown throughout the whole egg pocket and around it so that the whole of the egg is visible and thus a satisfactory candling of the eggs results. It will be seen that the eggs can be candled by the farmer, wholesaler or commission house, the retailer or the consumer or by all of them, without removing the eggs from the egg carrier, making the candling of the eggs quick, thorough, convenient and highly satisfactory. These holes or slots can be of any desired shape or contour and placed at any part of the egg carrier found most desirable.

The case can be locked without any extraneous means. To accomplish this result, I cut slits (15) in each of the double walls (6) of the egg tray (4') and the outer edges of the outer body parts (1) and (4) fit into these slits and wedge into a tight position, which can only be opened by manual means.

To prevent any end play of the parts forming the body and egg carrying tray, I provide slots (16) in the edge of body parts (1) and (4) which fit over the end wall (6) at each end of the carrier, thus preventing any endwise motion.

The egg pockets (7), by the peculiar formation of the parts forming them, support the eggs in a suspended position under which are air pockets, thus the eggs ride in safety and can be handled with less care, the breakage being consequently cut down to a minimum.

The egg carrier is very quickly packed and can readily be placed in the shipping crate to take the place of the usual "flats and fillers" now used, and can be handled with great convenience by the retailer and having a peculiar combined degree of stiffness and flexibility can be handled by the consumer with ease and pleasure and with satisfactory results.

I permeate the body of the carrier and the egg tray or either of them with water glass, silicate of soda, or other water proofing substance, which keeps insects and vermin from the eggs, keeps them and the case in a sanitary and wholesome condition and affords a pleasant touch when the egg carrier is handled.

While I have described and shown one specific form of egg carrier, it will readily be apparent that various modifications of the same can be made, without departing from the spirit or principle of the invention, and I wish to be understood that such modifications will fall within the scope of my invention.

What I claim as new and my invention and desire to secure by Letters Patent is,

1. In an egg carrier of the class described, a body portion formed of a series of halves, an egg carrying tray, said egg carrying tray provided with central slots to enable the tray to straddle the meeting edges of the two inner meeting halves in order to suspend the tray in the body portion, said egg carrying tray divided into pockets, the top of the pockets at each end being slitted, the outer halves when folded over having their edges pass into said slits to lock them in position, to form the folded egg carrier.

2. In an egg carrier of the class described, a body portion and an egg carrying tray suitably connected together, said body portion provided with a series of slots at each side thereof toward the top, said slots being elongated and at each end being narrowed and further elongated, a double series of slots oppositely disposed at the bottom thereof and in alinement with the elongated slots, so that when the carrier is closed and held to the light the rays of light will be reflected so that the whole of the egg is visible for candling purposes.

LOUIS A. DEGGINGER.

Witnesses:
H. E. CARSTENS,
JOHN W. STREHLI.